US012547929B2

(12) United States Patent
Khullar et al.

(10) Patent No.: US 12,547,929 B2
(45) Date of Patent: Feb. 10, 2026

(54) CORE DATA SERVICES PERFORMANCE ANNOTATIONS

(71) Applicant: SAP SE, Walldorf (DE)

(72) Inventors: Vipul Khullar, New Delhi (IN); Alisha Garg, Bathinda (IN); Ayush Singhal, Gurugram (IN); Anuradha Dhingan, Gurugram (IN); Kirti Sinha, Delhi (IN)

(73) Assignee: SAP SE, Walldorf (DE)

( * ) Notice: Subject to any disclaimer, the term of this patent is extended or adjusted under 35 U.S.C. 154(b) by 1120 days.

(21) Appl. No.: 17/381,064

(22) Filed: Jul. 20, 2021

(65) Prior Publication Data

US 2023/0033364 A1 Feb. 2, 2023

(51) Int. Cl.
*G06N 20/00* (2019.01)
(52) U.S. Cl.
CPC .................................. *G06N 20/00* (2019.01)
(58) Field of Classification Search
CPC ...... G06N 20/00; G06N 3/0455; G06N 5/025; G06N 3/044; G06N 3/084
See application file for complete search history.

(56) References Cited

U.S. PATENT DOCUMENTS 9,430,523 B2 8/2016 Falter et al.

FOREIGN PATENT DOCUMENTS

WO WO-2016167824 A1 10/2016

OTHER PUBLICATIONS

C. Zhang et al., "Automatic parameter recommendation for practical API usage," 2012 34th International Conference on Software Engineering (ICSE), Zurich, Switzerland, 2012, pp. 826-836, doi: 10.1109/ICSE.2012.6227136. (Year: 2012).*
Keijzer, Freek. "SAP S/4HANA Embedded Analytics." (2021). (Year: 2021).*
Cho et al. "Learning Phrase Representations using RNN EncoderâDecoder for Statistical Machine Translation" (Year: 2014).*
SAP—ABAP CDS Development User Guide SPS06, ABAP CDS Views https://help.sap.com/viewer/f2e545608079437ab165c105649b89db/7.5.6/en-US/7c078765ec6d4e6b88b71bdaf8a2bd9f.html.
CDS Annotations, https://help.sap.com/viewer/cc0c305d2fab47bd808adcad3ca7ee9d/7.5.9/en-US/630ce9b386b84e80bfade96779fbaeec.html.
Sanjeev Kumar, Part#10.CDS Views—@VDM Annotation (Nov. 4, 2019), https://blogs.sap.com/2019/11/04/part10.-cds-views-vdm-annotation/.
Tushar Sharma, ABAP Core Data Services—Part 3(Virtual Data model types), Oct. 9, 2017, https://blogs.sap.com/2017/10/09/abap-core-data-services-part-2virtual-data-model-types/.

(Continued)

*Primary Examiner* — Van C Mang
(74) *Attorney, Agent, or Firm* — Mintz Levin Cohn Ferris Glovsky and Popeo, P.C.

(57) ABSTRACT

A method, a system, and a computer program product for generating name recommendations in a core data services computing environment. A dataset for training a name data model is received. The name data model is configured for determination of a recommendation for one or more names in a plurality of names associated with one or more artifacts in a plurality of artifacts of a database management system. The name data model is trained using the received dataset and applied to generate one or more names associated with the one or more artifacts.

20 Claims, 12 Drawing Sheets

(56) References Cited

OTHER PUBLICATIONS

Laszlo Haladin, "STAD—ABAP Business Transaction Analysis," (Mar. 10, 2017), https://wiki.scn.sap.com/wiki/display/SRM/STAD+-+ABAP+Business+Transaction+Analysis.

Consuming Business Entities with SADL, https://help.sap.com/doc/saphelp_nw75/7.5.5/en-US/13/d9849973dd4174adaa375f568984bf/content.htm?no_cache=true.

Andrzej Halicki, ABAP CDS recursive association using hierarchy, Jan. 13, 2020, https://blogs.sap.com/2020/01/13/abap-cds-recursive-association-using-hierarchy/.

Shaip, Human Powered Data Labeling / Data Annotation Services, https://www.shaip.com/data-annotation/?utm_source=google&utm_medium=cpc&utm_content=455400412999&keyword=%2Bdata%20%2Bannotation%20%2Bservice&gclid=EAlalQobChMlgrKzuorF7QIVTyQrCh2VqAE7EAAYASAAEgJ4KfD_BwE.

Hierarchical Classification—a useful approach for predicting thousands of possible categories, https://www.kdnuggets.com/2018/03/hierarchical-classification.html.

Cerri, et al., "Hierarchical multi-label classification using local neural networks," J. Computer and System Sciences 80 (2014) 39-56.

* cited by examiner

FIG. 2a

| Size Category | Rule |
|---|---|
| #S | expected number of rows is < 1.000 |
| #M | expected number of rows is between 1.000 and 99.999 |
| #L | expected number of rows is between 100.000 and 9.999.999 |
| #XL | expected number of rows is between 10.000.000 and 99.999.999 |
| #XXL | expected number of rows is >= 100.000.000 |

| Service Quality | Rule |
|---|---|
| #A | Within business logic for high volume transactions or background processing such as creation of sales orders, material movements or financial postings |
| #B | Within business logic for transactions or background processing. All arguments of label A hold true. The difference is that for not so frequently executed transactions we might relax the KPIs |
| #C | From the UI in transactions for single object retrieval For read requests from the UI (e.g., via ODATA), all data which is requested may be known, which implies a different access pattern. |
| #D | The view may be consumed for analytical reporting. |
| #X | The view is built to push down application code to database, and/or is used for special purposes only, like data migration. |
| #P | The CDS view has been built to structure the SQL view model. It shall only be re-used in other views. The serviceQuality P has been introduced for non-VDM views and has a similar meaning as the 'private' annotation of VDM views. Can also be used for extension views. |

| Data Class | Rule |
|---|---|
| #TRANSACTIONAL | The view contains data which is written or changed in high volume transactions (also for background processing). Examples are header and items for Sales Order processing or Financial Postings. |
| #MASTER | Master data is read but not written or changed in high volume transactions (also for background processing). It typically drives the business process decisions when business logic is executed. It is also shown to the user as context information and to enable user decisions when these transactions are executed manually. Examples are material, business partner or account. |
| #ORGANIZATIONAL | The data describes the organizational structure of a company and its business processes. It can be seen as a special type of master data. This data is only written or changed when organization changes are implemented at the customer. Examples are sales unit, distribution channel and cost center. |
| #CUSTOMIZING | The data describes how a concrete business process is executed at the customer. It includes delivered content that may be enriched and/or extended by the customer. This data is typically even less common changed. Examples are countries, unit of measures, currency. |
| #META | Meta data specifies how the system is configured or describes the technical structure of entities. Typically, this is part of shipped content. Changes are done in fixes or upgrades. Examples are DDIC structures, field control, authorization objects. |
| #MIXED | This label shall be chosen if the CDS view contains data of several of the above data classes |

204

CORE DATA SERVICES PERFORMANCE ANNOTATIONS

TECHNICAL FIELD

This disclosure relates generally to data processing and, in particular, to core data services performance annotations, core data services view names, core data services field names, etc.

BACKGROUND

In today's world, many companies rely on software applications to conduct their business. Software applications deal with various aspects of companies' businesses, which can include finances, product development, human resources, customer service, management, and many other aspects. Software applications typically operate from servers and can be stored in memory. Core data services associated with database management systems implement various data models that are used in such software applications for their efficient operation.

SUMMARY

In some implementations, the current subject matter relates to a computer implemented for generating name recommendations in a core data services computing environment. The method may include receiving, by at least one processor, a dataset for training a name data model, the name data model is configured for determination of a recommendation for one or more names in a plurality of names associated with one or more artifacts in a plurality of artifacts of a database management system, training, by the at least one processor, the name data model using the received dataset, applying, by the at least one processor, the name data model to generate one or more names, and generating, by the at least one processor, one or more names associated with the one or more artifacts.

In some implementations, the current subject matter may include one or more of the following optional features. For example, the names may include at least one of the following: one or more performance annotations of core data services associated with the database management system, one or more names of one or more views of the core data services, one or more names of one or more fields of the core data services, and any combination thereof.

In some implementations, the names may be generated based on one or more interactions of a user with the core data services framework. The performance annotations of the core data services may be generated based on at least one of the following categories: a size of the artifacts category, a service quality associated with the artifacts category, a data class of the artifacts category, and any combination thereof.

In some implementations, the training may be performed using at least one of the following patterns: one or more properties of one or more database tables of the database management system associated with one or more views of the core data services pattern, one or more use of the views of the core data services pattern, one or more queries of the core data services pattern, and any combination thereof.

In some implementations, the names may also be generated using one or more historical names of the artifacts. The names may also be abbreviated using one or more dictionaries.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 2a illustrates an exemplary table containing size categories and corresponding rules;

FIG. 2b illustrates an exemplary table containing service quality categories and corresponding rules;

FIG. 2c illustrates an exemplary table containing data class categories and corresponding rules;

DETAILED DESCRIPTION

Figure 1:
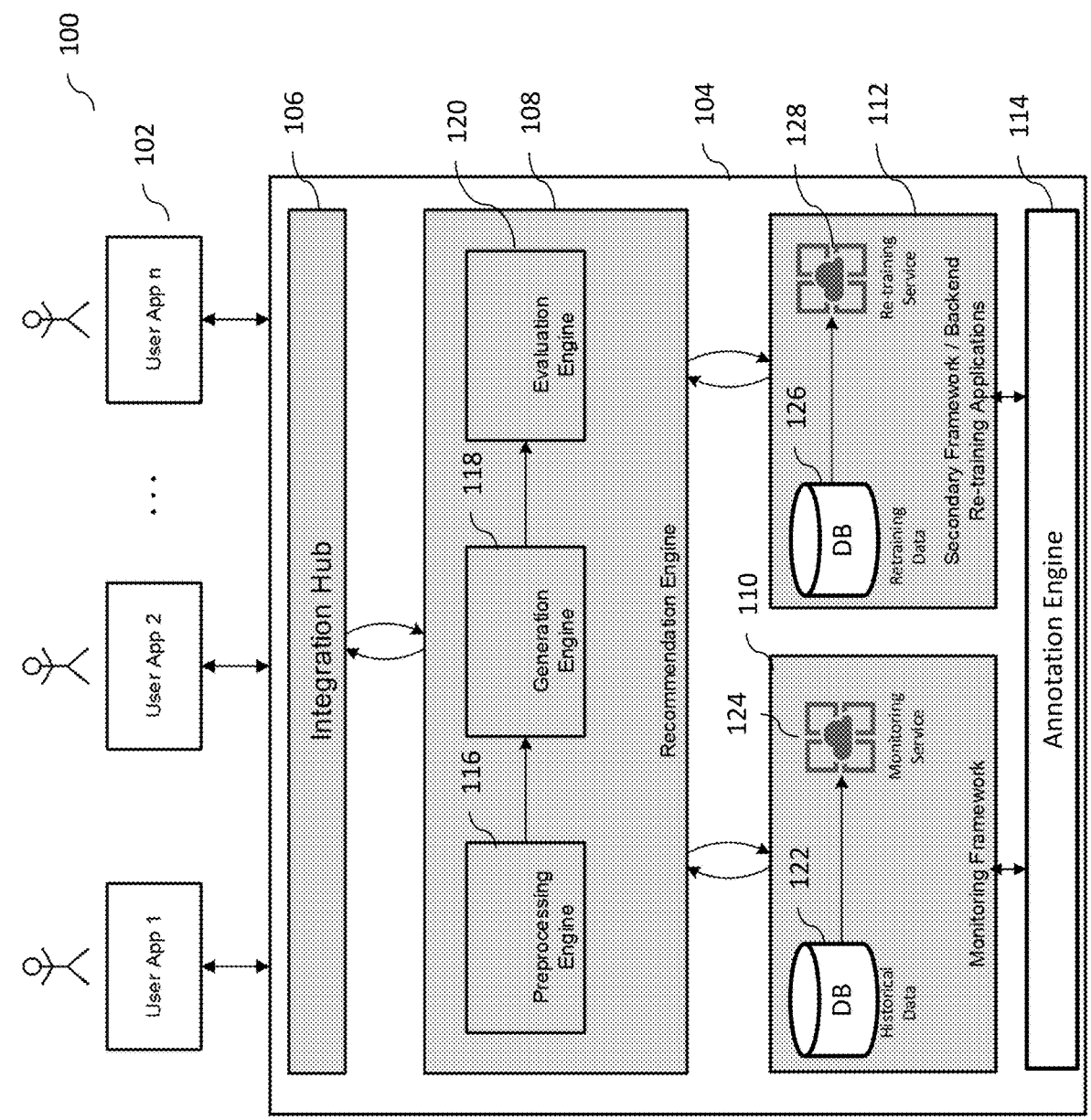
FIG. 1 illustrates an exemplary system for generating a performance annotations, according to some implementations of the current subject matter.

To address the deficiencies of currently available solutions, one or more implementations of the current subject matter provide for an ability to provide performance annotations to core data services.

Core data services (CDS) is an infrastructure that may be used by database developers to generate and/or create underlying and/or persistent data model that the application services may expose to user interface (UI) clients. By way of a non-limiting example, High-Performance Analytic Appliance (HANA) (as available from SAP SE, Walldorf, Germany) CDS may be a layer above database in order to define semantically-enriched data models. CDS may be used to define semantically rich data models in a database and to use these data models in various software applications/programs. CDS may be a central part of enabling code pushdown in software applications. In some cases, a core data services virtual data model (VDM) may be used. The VDM may be a structured representation of CDS views in a database and/or database cloud systems. The VDM may form a basis for data access in database systems in, for example, analytical consumption and/or application programming interfaces (APIs). The CDS views that make up the VDM may follow consistent modeling and/or naming rules. They expose various data (as, for example, may be stored in abstract database tables) in a way that is based on business semantics and thus, easier to consume. The CDS may implement various annotations. Annotations describe semantics related to various data. An annotation may be configured to enrich a definition of a model element in the CDS with, for example, metadata. It may be specified for a particular purposes/scope of a CDS objects, such as, for example, specific places in CDS source code.

A development process for CDS views may include, for example, selecting underlying database table(s)/view(s), selecting appropriate view name(s) and/or fieldname(s), adding JOIN condition(s), adding WHERE clause(s), selecting appropriate annotation(s), as well as other operations. In some implementations, the current subject matter may be configured to automate generation of annotations during development of CDS views. In particular, the current subject matter may be configured to automatically generate performance annotations for CDS views in accordance with various CDS guidelines for performance annotations as well as automatically generate technical names for development artifacts in accordance with various the CDS guidelines for nomenclature. These processes may be invoked independently of each other (e.g., in a sequential and/or parallel manner). Execution of one of these processes does not interrupt execution of the other process. For example, the current subject matter may be configured to generate a proposal of a CDS view/field name and generate performance annotation for that CDS view. Alternatively, or in addition to, the current subject matter may be configured to only generate proposal of a CDS view/field name. The current subject matter may be further configured (alternatively, or in addition to) to only generate performance annotation for that CDS view.

In some implementations, the current subject matter may be configured to executed the above processes using an intelligent CDS development framework system (e.g., as shown in FIG. 1 and discussed below). The framework may be configured to substantially eliminate/reduce manual effort that is required during development process as well as the approval process for technical names. Further, the framework may be configured to significantly reduce a degree of rework that is required when non-compliance with VDM guidelines is detected.

FIG. 1 illustrates an exemplary system 100 for generating a performance annotations, according to some implementations of the current subject matter. The system 100 may include one or more applications and/or pods and/or entities and/or users 102 (e.g., User App 1, User App 2, etc.), and an intelligent CDS development framework 104 that may be used for execution of the above processes, including but limited to, generation of annotations. The entities 102 may be deployable grouping of containerized computing components. An entity 102 may include of one or more containers (not shown in FIG. 1) that may be guaranteed to be co-located on the same node. The entities 102 may be created and/or managed in a computing environment (e.g., Kubernetes). An entity may have a shared storage and/or network resources, along with an indication of how to run the containers. The entity's contents may be co-located, co-scheduled, and/or run in a shared context.

Components of the system 100 may be communicatively coupled using one or more communications networks. The communications networks can include at least one of the following: a wired network, a wireless network, a metropolitan area network ("MAN"), a local area network ("LAN"), a wide area network ("WAN"), a virtual local area network ("VLAN"), an internet, an extranet, an intranet, and/or any other type of network and/or any combination thereof.

The components of the system 100 may include any combination of hardware and/or software. In some implementations, the components may be disposed on one or more computing devices, such as, server(s), database(s), personal computer(s), laptop(s), cellular telephone(s), smartphone(s), tablet computer(s), and/or any other computing devices and/or any combination thereof. In some implementations, the components may be disposed on a single computing device and/or can be part of a single communications network. Alternatively, the components may be separately located from one another.

The framework 104 may be configured to include an integration hub 106 that may be used for communication with the entities 102 and a recommendation engine 108, a monitoring framework 110, a secondary framework/backend 112, and an annotation engine 114. The recommendation engine 108 may include a processing engine 116, a generation engine 118, and an evaluation engine 120. The monitoring framework 110 may include a historical data database 122 and a monitoring service 124. The secondary framework 112 may include a retraining data database 126 and a re-training service 128. One or more entities 102 may include individual user devices, computing devices, software applications, clusters, objects, functions, and/or any other types of users, applications, clusters, and/or any combination thereof. The databases 122, 126 may be configured to store data in any desired format, e.g., table format, column-row format, key-value format, etc. (e.g., each key may be indicative of various attributes and each corresponding value may be indicative of attribute's value). As can be understood, the data may be stored in any other desired format.

Existing systems typically allow manually adding one or more of the following annotations: @ObjectModel.usageType. serviceQuality, @ObjectModel.usageType. sizeCategory, and @ObjectModel.usageType.dataClass, corresponding to service quality, size category, and data class, respectively, to each CDS view associated with database table(s). These annotations may provide hints to the system for improvement of it performance, where performance annotation checks may ensure that the CDS are compliant with defined KPIs for respective data class, size category and service quality. The current subject matter may be configured to propose/generate/add/etc. accurate performance annotations during development, which may be configured to not only save time but to ensure consistency in the process.

The following categorization rules may be taken into account when adding the above performance annotations. These rules are in the following categories: size, service quality, and data class. Currently, it is difficult for developers to manually identify categories for the above annotations, especially, when thousands of existing views maybe without proper categorization. Moreover, if the task is performed manually, there is no guarantee of consistency in the performance annotations being maintained. Below listed are the categorization rules and the problems associated with each of the categorization. FIG. 2a illustrates an exemplary table 200 containing size categories and corresponding rules. FIG. 2b illustrates an exemplary table 202 containing service quality categories and corresponding rules. FIG. 2c illustrates an exemplary table 204 containing data class categories and corresponding rules.

Figure 3:
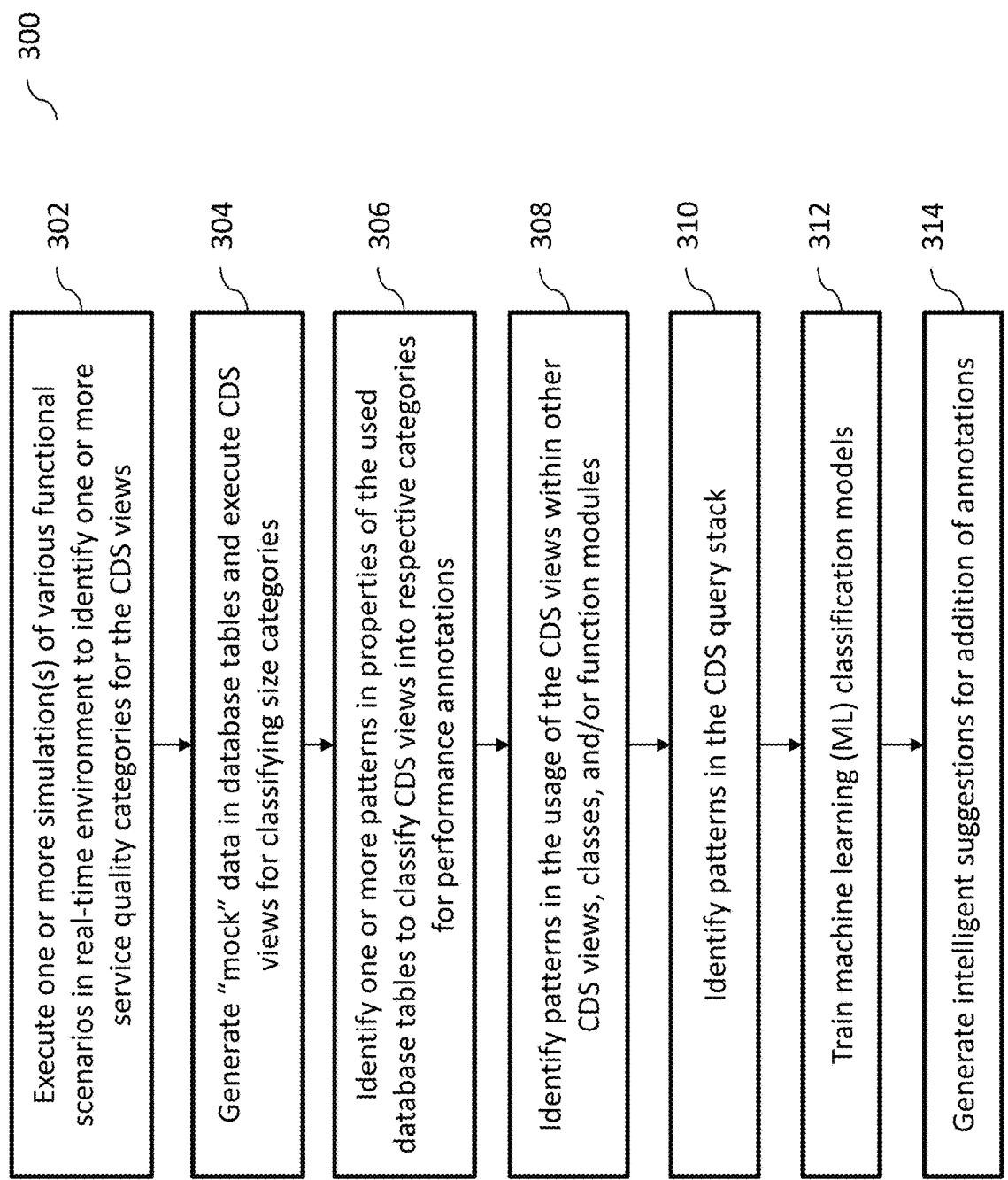
FIG. 3 illustrates an exemplary process for generation of core data services performance annotations, according to some implementations of the current subject matter.

FIG. 3 illustrates an exemplary method 300 for generation of CDS performance annotations, according to some implementations of the current subject matter. In particular, the process 300 may be configured to automate proposals of the annotations based on real-time analysis of various characteristics associated with the CDS views of database tables. The system shown in FIG. 1 may be configured to execute process 300. At 302, the system 100 may be configured to execute one or more simulation(s) of various functional scenarios in real-time environment to identify one or more service quality categories for the CDS views. At 304, the system 100 may be configured to generate "mock" data in database tables and execute CDS views for classifying size categories. Then, one or more patterns in properties of the used database tables may be identified to classify CDS views into respective categories for performance annotations, at 306. Further, patterns in the usage of the CDS views within other CDS views, classes, and/or function modules may also be identified, at 308. Additionally, patterns in the CDS query stack, e.g., other annotation values, WHERE clause associations, etc., may be identified, at 310. The above may then be used to train machine learning (ML) classification models based on one or more parameters discussed below, at 312. The ML model may be used to generate intelligent suggestions for addition of annotations, at 314.

The following is a discussion of classification model parameters may be used for training ML model in each of the size category, service quality category and data class category. The size category may be dependent upon a size category of the database tables used within the hierarchy of CDS views. Here, first, an automated test execution of the CDS view may be performed after generation of mock data in the used database tables (as discussed above in connection with FIG. 3), so that the expected records may be determined from the same. In some cases, it might not be possible to execute automated test scripts and/or mock data generation, thus, the expected size category may be determined using a categorization logic for size category, whereby a machine learning classification model may be trained for future generation CDS annotations.

Further, another parameter in the size category may related to the database tables having a fixed size along with the expected number of records. A traversal algorithm may be used to determine a hierarchy of database tables used within a CDS hierarchy and tables' corresponding size categories. Here, the system 100 may be configured to analyze an impact of various CDS constructs, e.g., WHERE clause(s), union(s) and/or association(s), on the overall size category of the CDS view. To overcome variations with respect to new data constructs and/or CDS statements, the ML model may be continuously trained.

In some implementations, a bottom-up approach may be used for estimation of the expected number of records from the bottom-most database and the CDS view in the CDS hierarchy. Then, going upwards, size category of each CDS may be determined based on the estimated size category of the immediately used database tables and/or CDS views.

The parameters in the service quality category may be based on a requirement to identify usage of different transactions, e.g., high volume background process, UI transactions, analytical processing, etc. However, since this is a costly and time-consuming operation, this may not be a feasible solution every time while adding annotations in CDS views. Hence, the system 100 may be configured to generate CDS annotations based on a pattern of usage of the CDS view within other CDS views, UI classes, background process programs, etc. For example, categories may be determined by analyzing a hierarchy of CDS views, other annotations used, types of CDS views, etc. For other categories, one or more scenarios within a software application may be classified as follows: high-volume transactional—frequently used, high-volume transactional—less frequently used, user interface based—single transaction, data migration scenarios, and analytical reports, and/or any other scenarios. Then, a determination of CDS views within these respective processes may be executed automatically by the system 100. Next, based on the usage within different types of transactions, the views may be classified into various categories. The machine learning model may be trained based on properties of the CDS views in the hierarchy, e.g., specific annotations, properties of objects that are using a particular object, etc. The ML classification model may also be used to differentiate between different service quality categories.

In the data class category, the data classes may be derived from underlying database tables that the CDS view includes. An analysis of used database tables may be performed to differentiate between several data classes for the underlying tables being used. For this analysis, a bottom-up approach may be used, where a bottom most layer database tables may be analyzed for their data class and classified accordingly. Going upwards, each CDS view may be subsequently classified. If a CDS uses database tables/CDS with different classes, its own data class may be mixed.

As such, for the above categories (e.g., size, service quality, data class, etc.), the following general approach may be executed by the system 100 to generate CDS performance annotations. A list of all CDS views for a particular namespace (e.g., name of a particular entity, object, etc.) may be generated. The system 100 may then determine a number of CDS views that are missing performance annotations. A view of any existing performance annotations may be generated as well. Subsequently, the recommendation engine 108 (e.g., generation engine 118) of the system 100 may be configured to generate one or more performance annotation suggestions for the CDS views that are missing performance annotations. The recommendation engine 108 may also execute one or more machine learning algorithms to identify one or more patterns based on one or more properties of CDS views (e.g., underlying database tables used, where-used list, etc.). Any underlying database properties, usage details (e.g., top-most CDS view, classes, programs, etc.) that are used for generation of performance annotations, and/or any other factors may also be presented by the system 100 to the user 102 (e.g., review, addition, modification, commenting, saving, etc.) in a user interface view. Any generated CDS view annotations may be programmatically added/copied to the actual CDS views.

In some implementations, the system 100 may be configured to generate suggestions for CDS view and/or field name(s). Some systems may have strict guidelines for CDS view and field names as well as a manual approval process of such names, which consumes substantial amount of time for developers and sometimes becomes a bottleneck in critical situations. For example, some systems may require that an artifact name should be as per the type of development object. The below Table 1 illustrates some of regular expression requirements for CDS views. The symbol asterisk(*) denotes that there may be additional term(s) for identification of the specific artifact but the name as a whole may follow a fixed pattern according to the type of the development artifact.

TABLE 1

Regular expression requirements for CDS views.

| Type of Development Artifact | Fix Pattern | Identification |
|---|---|---|
| Basic interface view | I_* | @VDM.viewType: #BASIC |
| Consumption view | C_* | @VDM.viewType: #CONSUMPTION |
| Transactional consumption view | C_*TP | @VDM.viewType: #CONSUMPTION @ObjectModel.transactionalProcessingDelegated: true |

Another example of requirements for CDS view and field names may relate to boundary conditions. In this case, some systems may require that technical names should follow one or more of the following boundary conditions: length of names should not exceed 30 characters, names should be globally unique, no namespaces, UpperCamelCase, and singular names (e.g., selected names should have well-defined descriptions). For example, the following may be a name of a basic CDS view: <CDSViewPrefix><ObjectNodeName>, e.g., I_SalesOrder.

Figure 4:
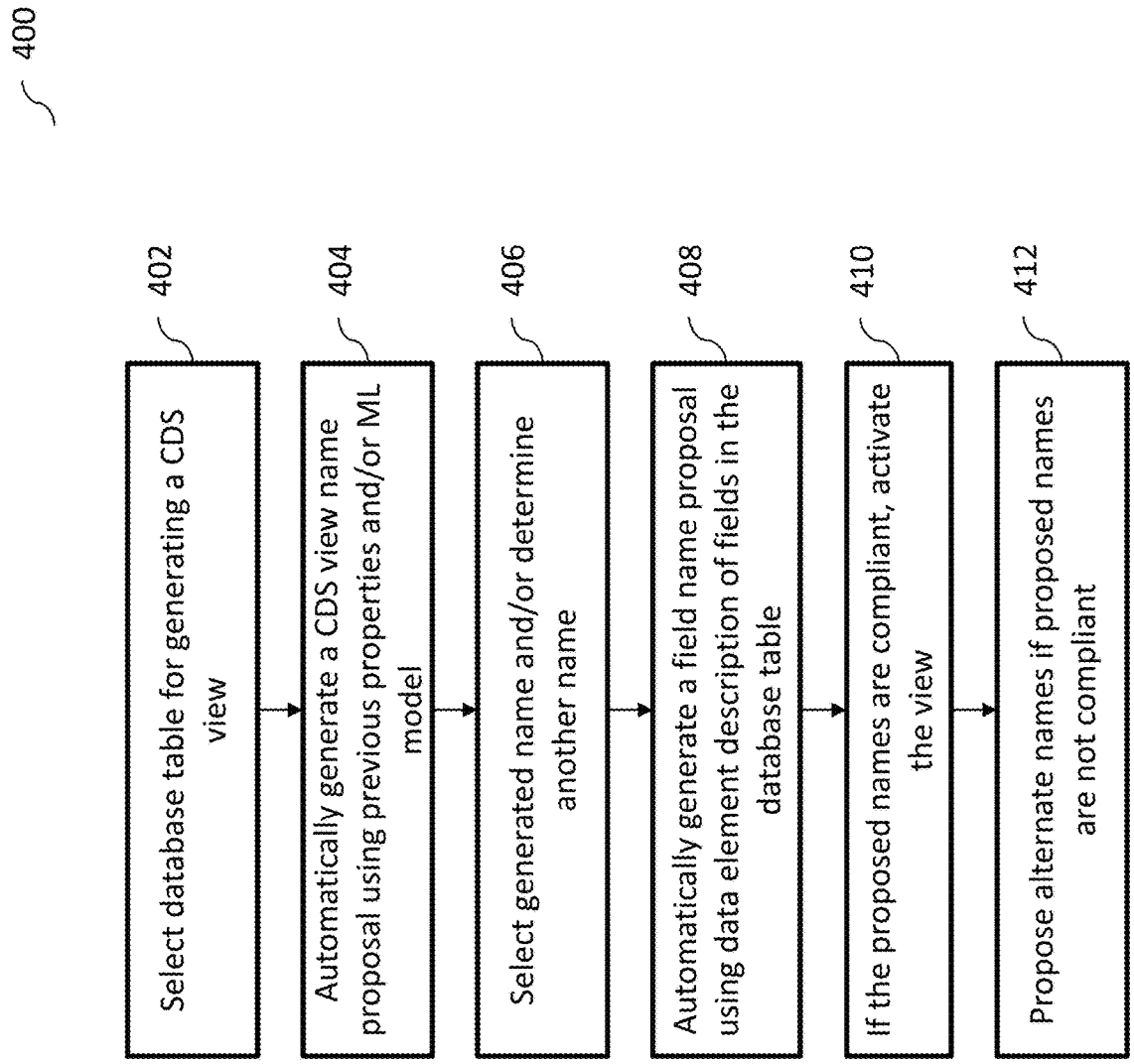
FIG. 4 illustrates an exemplary process for generation of CDS view and/or field name(s), according to some implementations of the current subject matter.

FIG. 4 illustrates an exemplary process 400 for generation of CDS view and/or field name(s), according to some implementations of the current subject matter. The method 400 may be configured to generate and/or validate CDS view names and fieldnames. Specifically, it may be configured to generate/validate names using one or more of the following techniques: object description/label analysis, user input analysis, string analysis, such as, for instance, using built-in dictionary for English language (or any other language), machine learning on data related to names that may have been previously validated, and/or any other techniques. The method 400 may be configured to be performed by the system 100, in particular the recommendation engine 108, including its preprocessing engine 116, generation engine 118, and evaluation engine 120, as shown in FIG. 1 (and discussed below). At 402, the system 100 (e.g., a user 102 or any other processes) may be configured to select a database tables for generate a CDS view. The system 100 may then automatically generate a proposal for a name of the CDS view, at 404. Such proposal may be based on previous properties of the table. Alternatively, or in addition to, the name may be proposed based on an execution of the machine learning algorithms (e.g., using one or more boundary conditions).

At 406, the system 100 may be configured to select the proposed name for the CDS view. Alternatively, or in addition to, the system 100 may be configured to select another name. Here, such selected other name may need to be validated and/or approved. The system 100 may then automatically generate a proposal for a field name, at 408. The proposal may be based on a description of a field for a specific data element in the selected database table (at 402).

At 410, the system 100 may be configured to activate the view for which proposals have been generated during the method 400. The activation may be based on an indication that all details in the CDS view have been entered. Such detains may include at least one of the following: description, annotations, JOINs, WHERE clauses, etc.

At 412, if the names are not compliant with the system guidelines, rules, etc., the system 100 may be configured to generate alternate name proposals. In this case, the alternate name proposal may be generated using CDS view details that may have been entered (e.g., by the user 102).

As stated above, the recommendation engine 104 may be configured to generate proposal for CDS view and/or field names. As shown in FIG. 1, the recommendation engine 104 may be configured to include the preprocessing engine 116, the generation engine 118 and the evaluation engine 120. In some implementations, each of the components 116-120 may be configured as an independent microservice.

Figure 5:
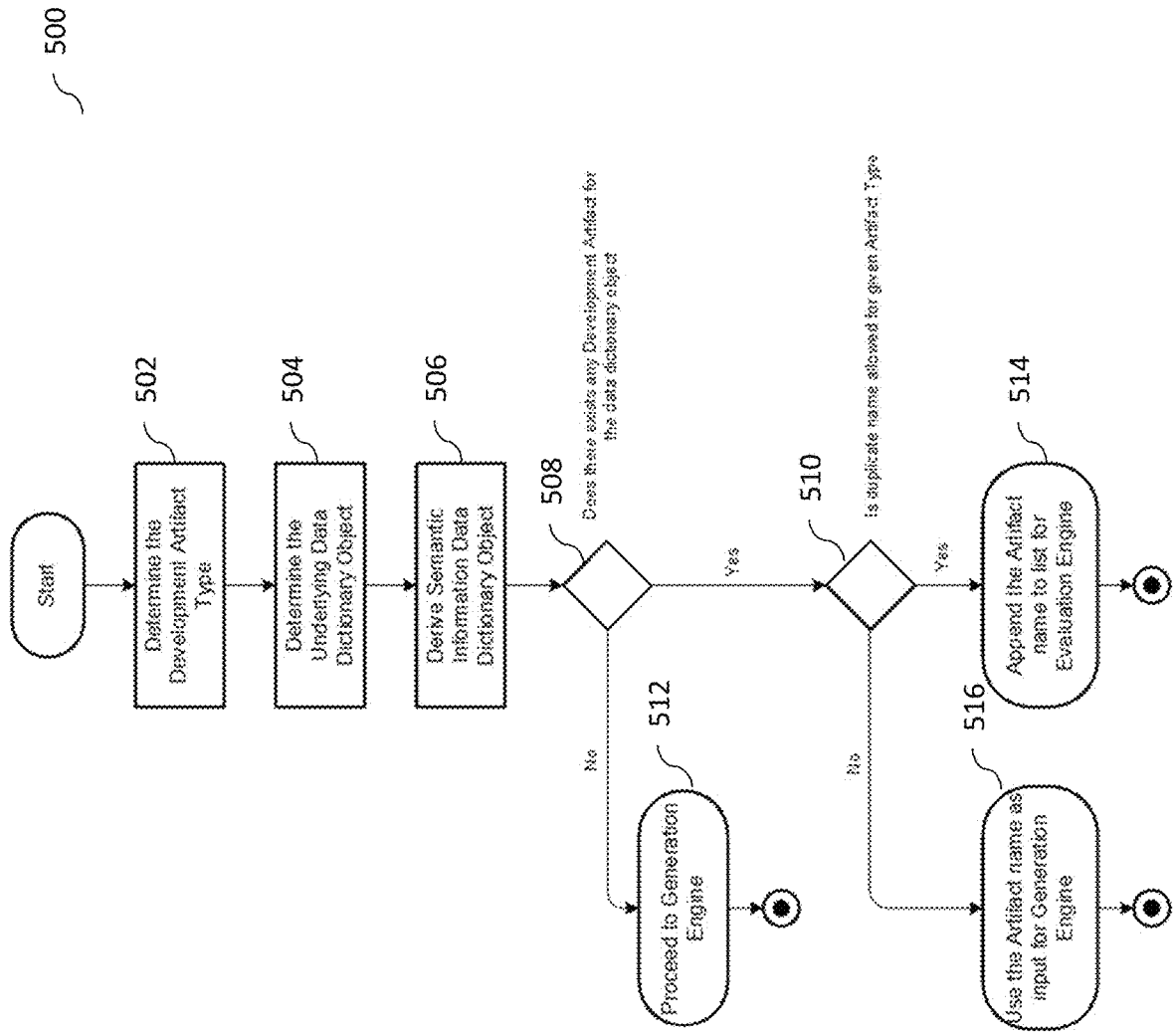
FIG. 5 illustrates an exemplary process for preprocessing of information in database tables for extraction of data that will be used for generation recommendations of names, according to some implementations of the current subject matter.

The preprocessing engine 116 may be configured to perform preprocessing to extract relevant data from database tables, which may include at least one of the following: development artifact type, underlying data dictionary object, any existing artifacts related to a data dictionary object, semantic information of the data dictionary object, and/or any other data. FIG. 5 illustrates an exemplary process 500 for preprocessing of information in database tables for extraction of data that will be used for generation recommendations of names, according to some implementations of the current subject matter. At 502, the engine 116 may be configured to determine a type of development artifact (e.g., for which name generation may be needed). Any underlying data dictionary (DDIC) object(s) may be subsequently determined, at 504, and semantic information data dictionary object(s) may be determined, at 506.

At 508, the engine 116 may be configured to determine whether there exist any development artifact for the data dictionary object. If not, the information determined during operations 502-506 may be provided to the generation engine 118 (shown in FIG. 1). Otherwise, the engine 116 may proceed to 510, where it may determine whether a duplicate name may be allowed for a particular artifact type. If so, a list of artifact names may be generated and provided to the evaluation engine 120, at 514. Otherwise, if the duplicate names are not allowed for a particular artifact type, the artifact name may be provided to the generation engine 118, at 516. Thus, as the output of preprocessing engine, two lists may be generated. Both lists may include appropriate artifact names, where one list may be provided to the generation engine 118 and the other to the evaluation engine 120.

The generation engine 118 may be configured as an augmented recurrent neural network (RNN) based text generator with an optimizer (e.g., Adam optimizer—a replacement optimization algorithm for stochastic gradient descent for training deep learning models). A cross entropy loss function (or any other function) may be used to train the model. The machine learning model for generation engine 118 may be trained using historical data, as shown in Tables 2-3 below. In some instances, the following categories of input data may be used. One category may include input data when only semantic information is known (as shown in Table 2). Another category may include input data when user input may be available in addition to semantic information (as shown in Table 3).

TABLE 2

Semantic information input data.

| Input | Data Element | Data Type | Field Label | Output (Proposed Field Name) |
|---|---|---|---|---|
| — | VBELN_VA | String | Sales Document Number | SalesDocument |

TABLE 3

Semantic information and user input data.

| Input | Data Element | Data Type | Field Label | Output (Proposed Field Name) |
|---|---|---|---|---|
| OrderReleasedStatus | ORDER_RELEASED_FLAG | Boolean | Flag for Order release status | OrderIsReleased |
| AllowedTolerance | TOLERANCE_FLAG | Boolean | Flag for Tolerance | ToleranceIsAllowed |

Figure 6:
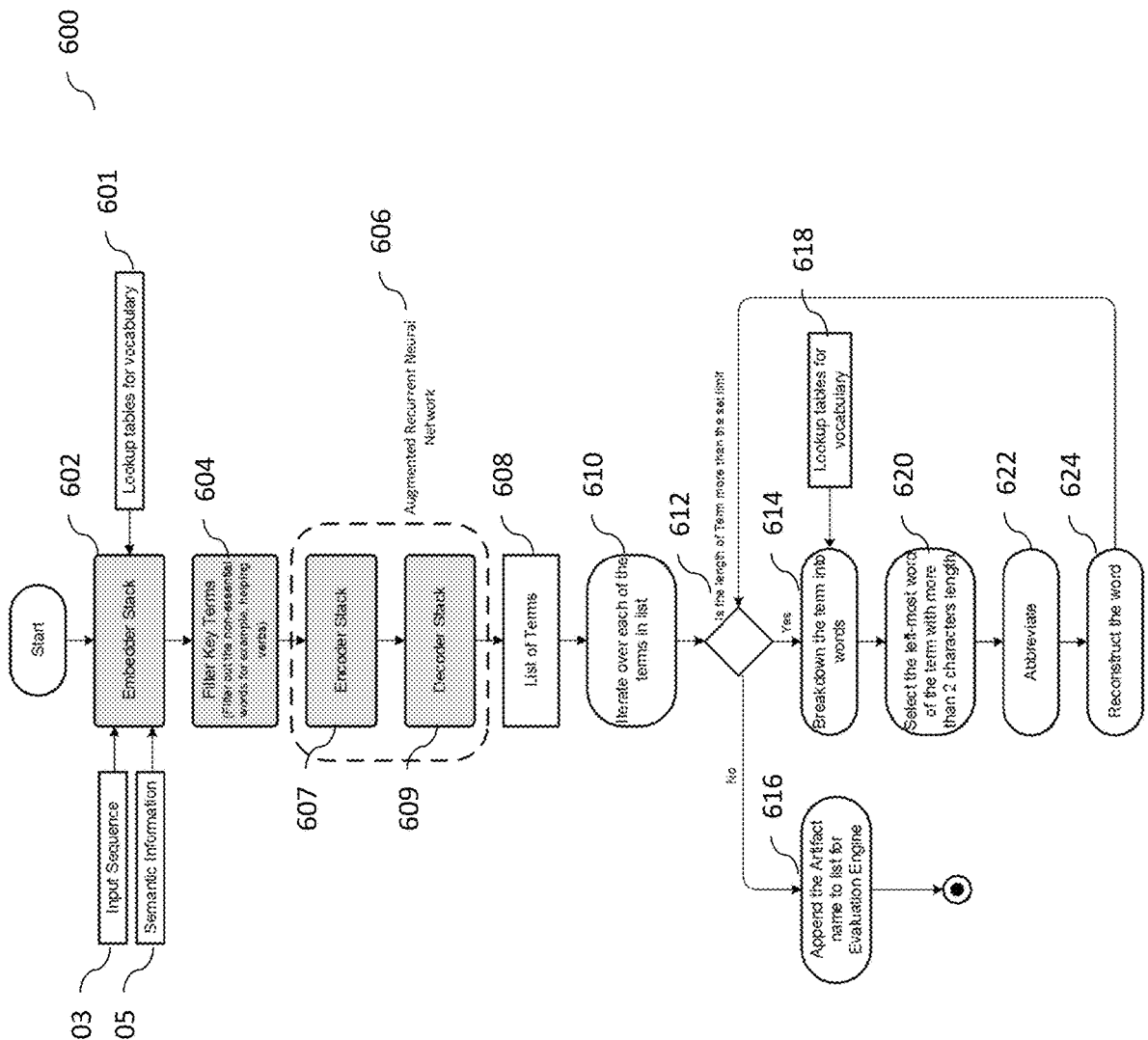
FIG. 6 illustrates an exemplary method for generation of view and field names, according to some implementations of the current subject matter.

FIG. 6 illustrates an exemplary method 600 for generation of view and field names, according to some implementations of the current subject matter. The generation engine 118 may be configured to perform the method 600. At the embedder stack 602, the generation engine 118 may receive one or more lookup tables for vocabulary 601, an input sequence 603, and/or semantic information 605. In particular, metadata context for the generation engine 118 may be set using data dictionary object type (e.g., CDS consumption view and/or field name), which may correspond to the semantic information 605, as well as the lookup tables 601. Using the metadata context and user input sequence 603, the embedder stack 602 may be used to provide word embedding. Such word embedding(s) may correspond to tokenized numeric representation(s) of linguistic words. The word embedding(s) may be filtered to determine the most important term(s) from all the selected terms, at 604. For example, any non-essential words (e.g., helping verbs) may be filtered out.

The method 600 may then proceed to the augmented recurrent neural network 606, which may include an encoder stack 607 and a decoder stack 609. In particular, during the operation of the RNN 606, the generation engine may receive the metadata information from pre-processing engine 116 (as generated by the process 500 shown in FIG. 5) and any input from existing data. The RNN 606 may be configured to execute an algorithm to generate one or more technical names for artifacts (e.g., objects, views, fields, tables, operations, etc.), at 608. The RNN 606 may use semantic description(s) of terms to generate names. It may also learn from names used in past data. The RNN 606 may be configured to ignore noise words (e.g., data, detail, document, master, record, etc.), which it may learn to do based on a learned algorithm. Moreover, the RNN may learn from annotations that may have been used in past data.

The generation engine 118 may be configured to iterate over each of the terms in the list of terms generated by the RNN 606, at 610, to determine whether the length of the generated term is more than a predetermined length limit (which may be preset by the system 100), at 612. If at 612, it determines that the length of a term is not greater than the predetermined length limit, the generation engine 118 may generate a list of terms that may be provided to the evaluation engine 120 for evaluation.

If at 612, the generation engine 118 determines that the length of the term exceeds the predetermined length limit, the engine 618 may breakdown the term into one or more words, at 614. Here, the engine 618 may use lookup tables 618 for vocabulary to determine how to breakdown the words. At 620, left-most word of the broken-down term with more than a predetermine number of characters (e.g., 2) may be selected and passed to an abbreviation operation, at 622.

In some cases, technical terms may be restricted to a fixed length in accordance with specific system guidelines. If the length of an output term is more than a particular word length, the method 600, at 622, may perform the following process to abbreviate the term. Using general English dictionary (and/or any other language dictionary as per system language), breakdown the raw input into words, identify a base word (e.g., a main action word), identify one or more helping verb(s), and identify one or more auxiliary word(s). Then, the method 600 may perform abbreviation of terms using historical data to determine the most suited abbreviation for a particular term. The term may than be reconstructed using abbreviated words, 624.

Once the generation of the names (and/or the annotations) have been completed, the evaluation engine 120 (shown in FIG. 1) may be configured to perform evaluation. In particular, the evaluation engine 120 may receive a list of prospective names (e.g., that may be collated) from the pre-processing engine 116 and/or generation engine 118. The evaluation engine 120 may be configured to generate one or more recommendations. For example, such recommendations may be in accordance with system guidelines. Moreover, multiple recommendation may be generated. Each recommendation may be ranked based on how it may fulfill the system guidelines. The recommendations may be understandable to the user (e.g., user 102).

In some implementations, the generated names/terms may be further evaluated to determine their suitability and/or applicability. As such, the evaluation engine 120 may be configured to execute the following process to assess each received name/term. At the outset, the engine 120 may evaluate names/terms in accordance with system guidelines. It may search database catalog(s) (e.g., global field names catalog) to determine whether any of the generated names/terms exist. If so, such names/terms may be marked. The evaluation engine 120 may also evaluate similarity between global field names catalog description and semantic description of the data dictionary object. The marked names/terms may further be evaluated for duplicity (e.g., whether duplicate names/terms are/are not allowed).

If the duplicate names are not allowed, the engine 120 may be configured to calculate information divergence between technical names/terms and names/terms in the global field names catalog using the following:

The information distance (ID) can be written as follows:

$$D_\alpha(P, Q) = \frac{1}{1-\alpha}\log_2\left(\sum_{i=1}^n p_i^\alpha q_i^{1-\alpha}\right) \quad (1)$$

$$D_0(P, Q) = -\log_2\left(\sum_{i=1}^n q_i\right), \text{ when } \alpha = 1$$

$$D_1(P, Q) = -\sum_{i=1}^n p_i \log_2\left(\frac{p_i}{q_i}\right) \text{ when } \alpha = 2$$

If the similarity index is less than a threshold index value, then the selected name may be one of the suitable candidates for the technical name/term of the artifact.

The engine 120 may be further configured to assign a score to the name/term using the average of similarity index and/or information distance. The scores may be normalized all names/terms to a scale of 0 to 1.

However, if the generated name/term violates any system guidelines then a negative score may be assessed to the name/term. Since there are multiple names/terms that may be provided by the generating engine 118 and multiple system guidelines may exist, a cumulative score for each generated name/term may be used to rate each such name/term. In some exemplary implementations, the recommendation engine 108 (shown in FIG. 1) may be configured to recommend top five recommended names/terms using the ratings received from evaluation engine 120.

Referring back to FIG. 1, the framework 104's monitoring framework 110 (using its monitoring service 124) may be configured to perform continuous monitoring to evaluate divergence between the recommended technical names/terms and names/terms as per system guidelines. If the divergence exceeds a predetermined threshold, re-training may be triggered, which may be executed by the secondary framework 112. In some exemplary implementations, data received from user 102's interaction with the framework 104 may be used for re-training purposes. For example, as the recommendation engine 108 suggests a list of names/terms for the user 102 to select from, suggestions that are not selected by user 102 may form a set of negative outputs which may be avoided by the machine learning model of the generation engine 118. These may form a dataset for re-training of the model and thereby increase efficiency of machine learning algorithm.

As stated above, the retraining may be performed by the secondary framework 112 (e.g., its retraining service 128). The retraining and/or replacement of the model may be performed by framework 112 (e.g., in the backend) upon determination that there are significant differences between the names/terms. For example, the following models may be used for retraining/replacement purposes. One model may be deployed in a production environment and another as a backup model, which may be continuously re-trained with the new data that is received from user interactions with framework 104. The outputs from both models may be compared (e.g., using cosine similarity index). Any dissimilar outputs may form two sets for comparison, and an entropy divergence of the two sets may be determined. For example, entropy of a discrete variable X with possible outcomes $x_1, x_2, x_3, \ldots x_n$ may be defined using the following equation:

$$H_\alpha(X) = \frac{1}{1-\alpha}\log_2\left(\sum_{i=1}^n p_i(\alpha)\right) \quad (2)$$

where N is the total number of such groups or length of total items in hash table; $p(x_i)$ is the probability of the $i^{th}$ outcome of X.

If the entropy exceeds a predetermined threshold, the backup model may be configured to replace the model deployed in production environment and/or any older model may be archived.

In some implementations, the current subject matter can be implemented in various in-memory database systems, such as a High-Performance Analytic Appliance ("HANA") system as developed by SAP SE, Walldorf, Germany. Various systems, such as, enterprise resource planning ("ERP") system, supply chain management ("SCM") system, supplier relationship management ("SRM") system, customer relationship management ("CRM") system, and/or others, can interact with the in-memory system for the purposes of accessing data, for example. Other systems and/or combinations of systems can be used for implementations of the current subject matter. The following is a discussion of an exemplary in-memory system.

Figure 7:
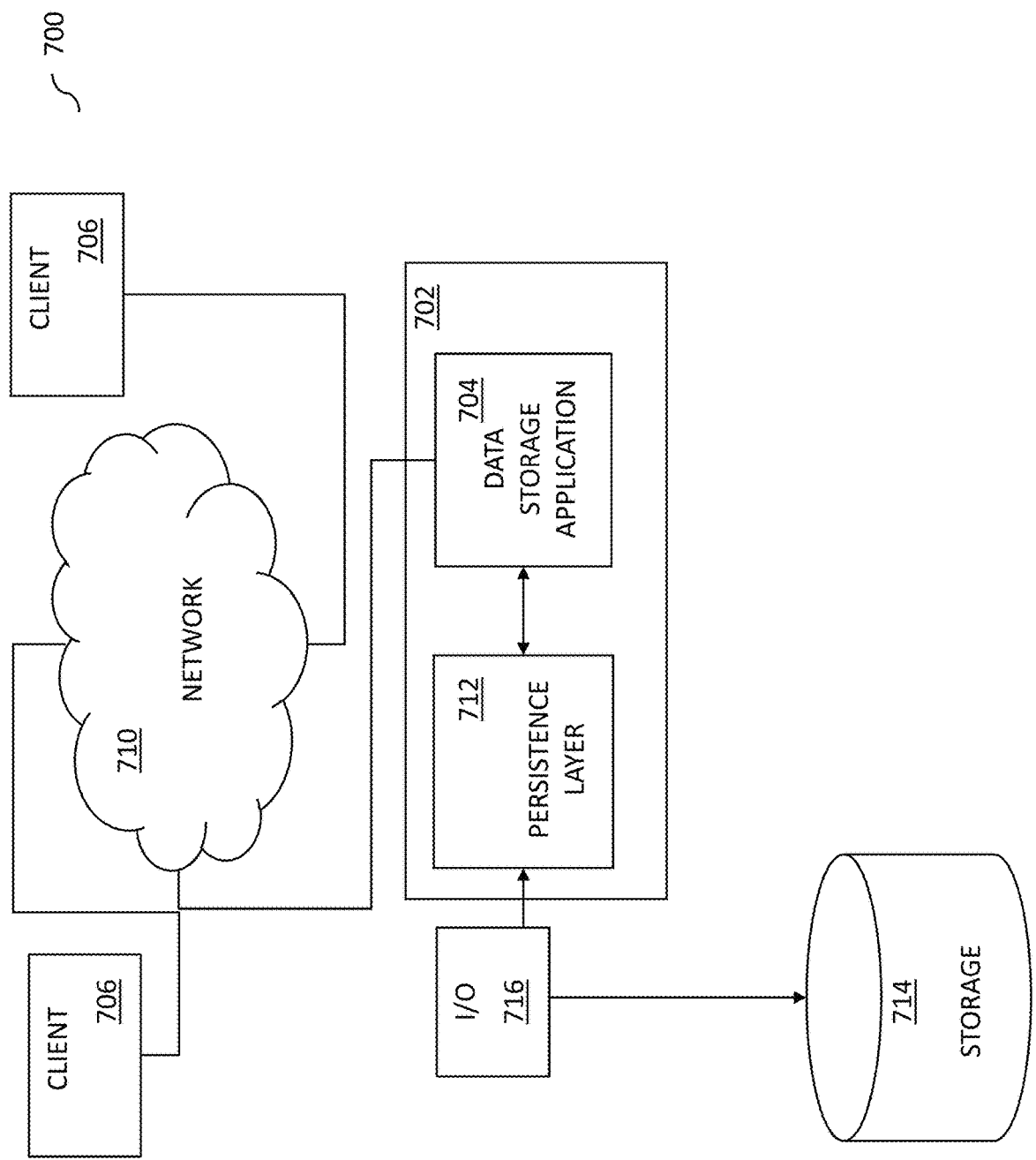
FIG. 7 is a diagram illustrating an exemplary system including a data storage application, according to some implementations of the current subject matter.

FIG. 7 illustrates an exemplary system 700 in which a computing system 702, which can include one or more programmable processors that can be collocated, linked over one or more networks, etc., executes one or more modules, software components, or the like of a data storage application 704, according to some implementations of the current subject matter. The data storage application 704 can include one or more of a database, an enterprise resource program, a distributed storage system (e.g. NetApp Filer available from NetApp of Sunnyvale, CA), or the like.

The one or more modules, software components, or the like can be accessible to local users of the computing system 702 as well as to remote users accessing the computing system 702 from one or more client machines 706 over a network connection 710. One or more user interface screens produced by the one or more first modules can be displayed to a user, either via a local display or via a display associated with one of the client machines 706. Data units of the data storage application 704 can be transiently stored in a persistence layer 712 (e.g., a page buffer or other type of temporary persistency layer), which can write the data, in the form of storage pages, to one or more storages 714, for example via an input/output component 716. The one or more storages 714 can include one or more physical storage media or devices (e.g. hard disk drives, persistent flash memory, random access memory, optical media, magnetic media, and the like) configured for writing data for longer term storage. It should be noted that the storage 714 and the input/output component 716 can be included in the computing system 702 despite their being shown as external to the computing system 702 in FIG. 7.

Data retained at the longer term storage 714 can be organized in pages, each of which has allocated to it a defined amount of storage space. In some implementations, the amount of storage space allocated to each page can be constant and fixed. However, other implementations in which the amount of storage space allocated to each page can vary are also within the scope of the current subject matter.

Figure 8:
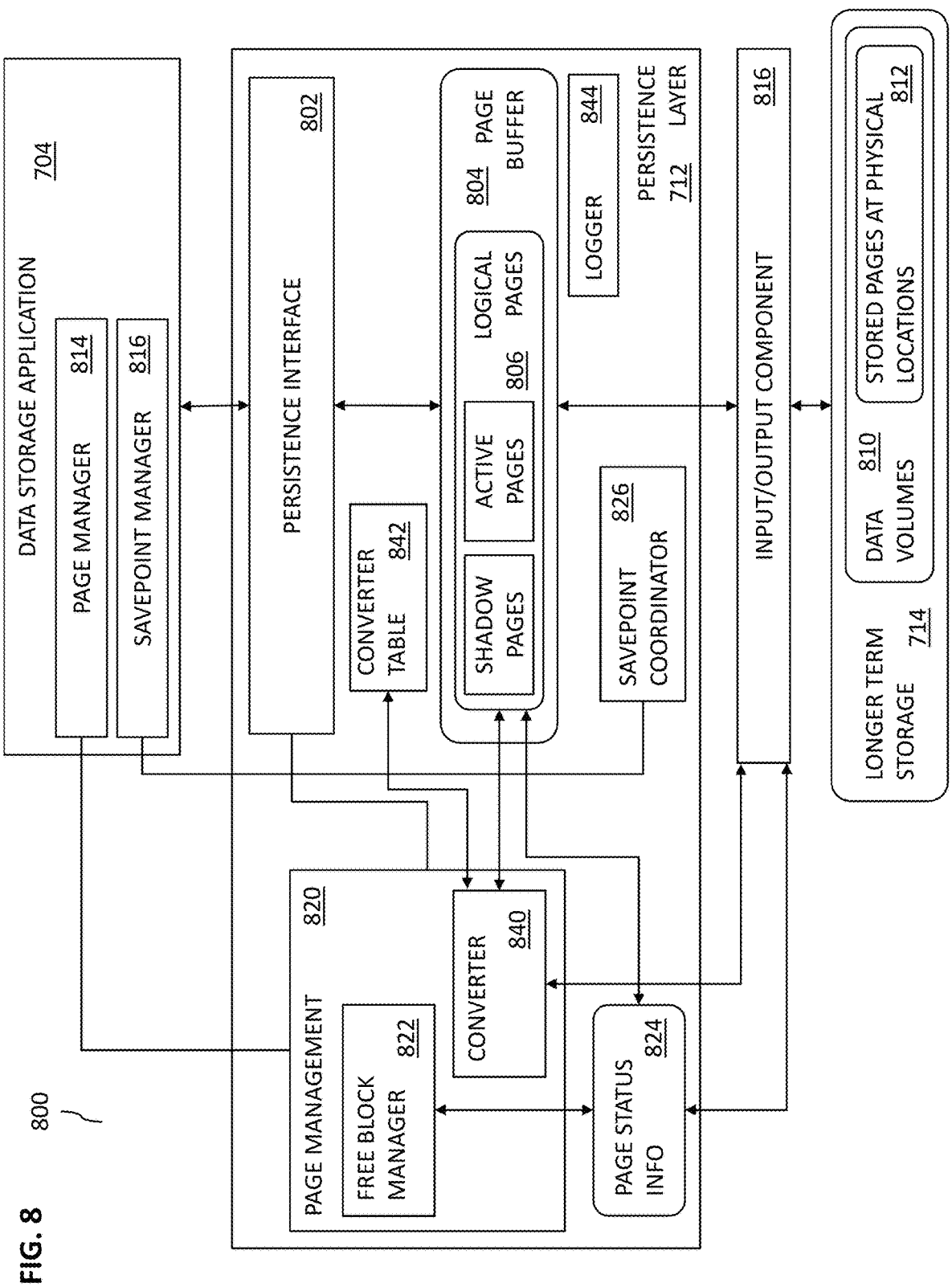
FIG. 8 is a diagram illustrating details of the system of FIG. 7.

FIG. 8 illustrates exemplary software architecture 800, according to some implementations of the current subject matter. A data storage application 704, which can be implemented in one or more of hardware and software, can include one or more of a database application, a network-attached storage system, or the like. According to at least some implementations of the current subject matter, such a data storage application 704 can include or otherwise interface with a persistence layer 712 or other type of memory buffer, for example via a persistence interface 802. A page buffer 804 within the persistence layer 712 can store one or more logical pages 806, and optionally can include shadow pages, active pages, and the like. The logical pages 806 retained in the persistence layer 712 can be written to a storage (e.g. a longer term storage, etc.) 714 via an input/output component 716, which can be a software module, a sub-system implemented in one or more of software and hardware, or the like. The storage 714 can include one or more data volumes 810 where stored pages 812 are allocated at physical memory blocks.

In some implementations, the data storage application 704 can include or be otherwise in communication with a page manager 814 and/or a savepoint manager 816. The page manager 814 can communicate with a page management module 820 at the persistence layer 712 that can include a free block manager 822 that monitors page status information 824, for example the status of physical pages within the storage 714 and logical pages in the persistence layer 712 (and optionally in the page buffer 804). The savepoint manager 816 can communicate with a savepoint coordinator 826 at the persistence layer 712 to handle savepoints, which are used to create a consistent persistent state of the database for restart after a possible crash.

In some implementations of a data storage application 704, the page management module of the persistence layer 712 can implement a shadow paging. The free block manager 822 within the page management module 820 can maintain the status of physical pages. The page buffer 804 can include a fixed page status buffer that operates as discussed herein. A converter component 840, which can be part of or in communication with the page management module 820, can be responsible for mapping between logical and physical pages written to the storage 714. The converter 840 can maintain the current mapping of logical pages to the corresponding physical pages in a converter table 842. The converter 840 can maintain a current mapping of logical pages 806 to the corresponding physical pages in one or more converter tables 842. When a logical page 806 is read from storage 714, the storage page to be loaded can be looked up from the one or more converter tables 842 using the converter 840. When a logical page is written to storage 714 the first time after a savepoint, a new free physical page is assigned to the logical page. The free block manager 822 marks the new physical page as "used" and the new mapping is stored in the one or more converter tables 842.

The persistence layer 712 can ensure that changes made in the data storage application 704 are durable and that the data storage application 704 can be restored to a most recent committed state after a restart. Writing data to the storage 714 need not be synchronized with the end of the writing transaction. As such, uncommitted changes can be written to disk and committed changes may not yet be written to disk when a writing transaction is finished. After a system crash, changes made by transactions that were not finished can be rolled back. Changes occurring by already committed transactions should not be lost in this process. A logger component 844 can also be included to store the changes made to the data of the data storage application in a linear log. The logger component 844 can be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations can occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information can be written by the logger component 844 whenever a change is made. This information can be written to disk at latest when the transaction ends. The log entries can be persisted in separate log volumes while normal data is written to data volumes. With a redo log, committed changes can be restored even if the corresponding data pages were not written to disk. For undoing uncommitted changes, the persistence layer 712 can use a combination of undo log entries (from one or more logs) and shadow paging.

The persistence interface 802 can handle read and write requests of stores (e.g., in-memory stores, etc.). The persistence interface 802 can also provide write methods for writing data both with logging and without logging. If the logged write operations are used, the persistence interface 802 invokes the logger 844. In addition, the logger 844 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 844. For an entry of type "update", for example, this would be the identification of the affected record and the after image of the modified data.

When the data application 704 is restarted, the log entries need to be processed. To speed up this process the redo log is not always processed from the beginning. Instead, as stated above, savepoints can be periodically performed that write all changes to disk that were made (e.g., in memory, etc.) since the last savepoint. When starting up the system, only the logs created after the last savepoint need to be processed. After the next backup operation the old log entries before the savepoint position can be removed.

When the logger 844 is invoked for writing log entries, it does not immediately write to disk. Instead it can put the log entries into a log queue in memory. The entries in the log queue can be written to disk at the latest when the corresponding transaction is finished (committed or aborted). To guarantee that the committed changes are not lost, the commit operation is not successfully finished before the corresponding log entries are flushed to disk. Writing log queue entries to disk can also be triggered by other events, for example when log queue pages are full or when a savepoint is performed.

With the current subject matter, the logger 844 can write a database log (or simply referred to herein as a "log") sequentially into a memory buffer in natural order (e.g., sequential order, etc.). If several physical hard disks/storage devices are used to store log data, several log partitions can be defined. Thereafter, the logger 844 (which as stated above acts to generate and organize log data) can load-balance writing to log buffers over all available log partitions. In some cases, the load-balancing is according to a round-robin distributions scheme in which various writing operations are directed to log buffers in a sequential and continuous manner. With this arrangement, log buffers written to a single log segment of a particular partition of a multi-partition log are not consecutive. However, the log buffers can be reordered from log segments of all partitions during recovery to the proper order.

As stated above, the data storage application 704 can use shadow paging so that the savepoint manager 816 can write a transactionally-consistent savepoint. With such an arrangement, a data backup comprises a copy of all data pages contained in a particular savepoint, which was done as the first step of the data backup process. The current subject matter can be also applied to other types of data page storage.

Figure 9:
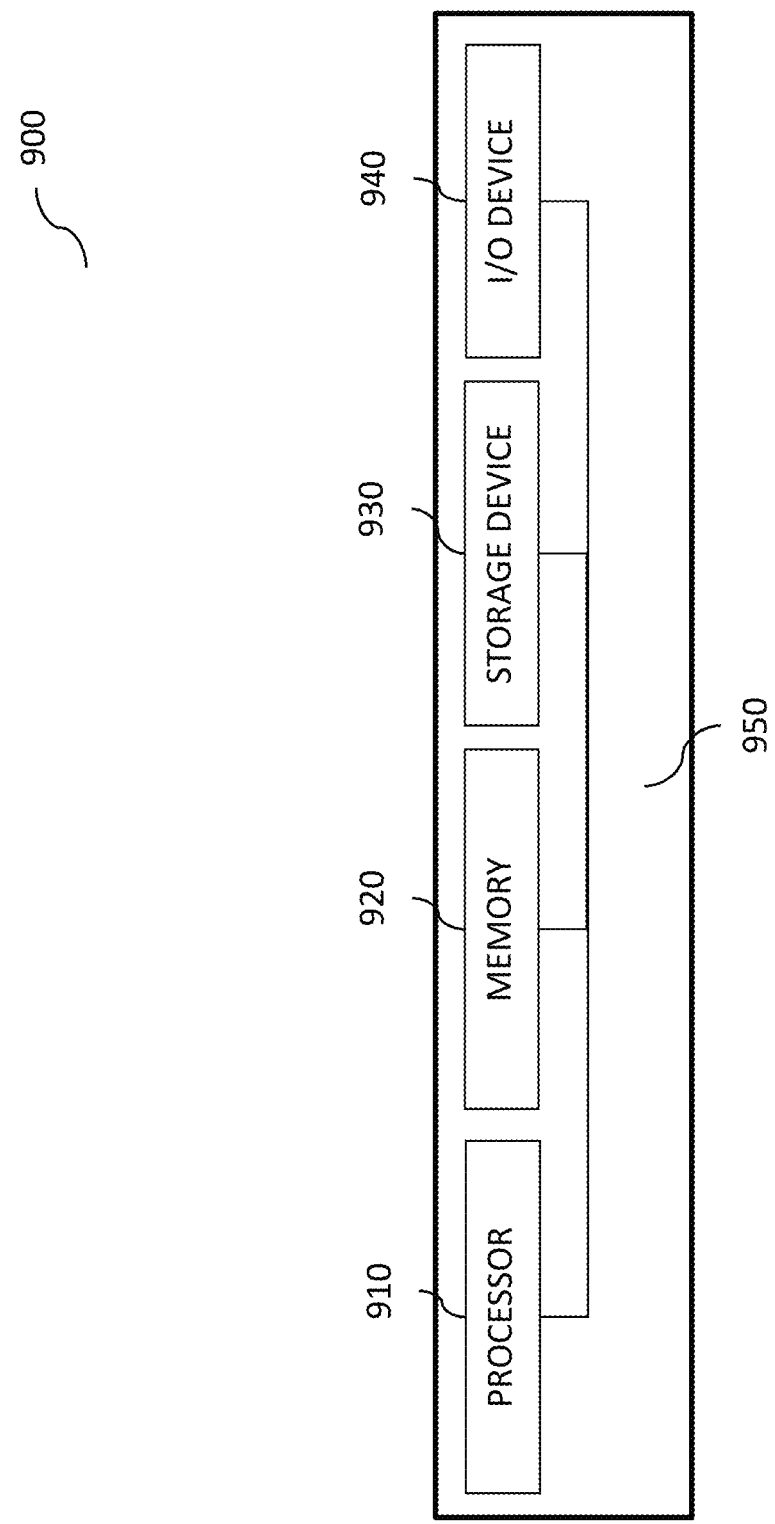
FIG. 9 illustrates an exemplary system, according to some implementations of the current subject matter.

In some implementations, the current subject matter can be configured to be implemented in a system 900, as shown in FIG. 9. The system 900 can include a processor 910, a memory 920, a storage device 930, and an input/output device 940. Each of the components 910, 920, 930 and 940 can be interconnected using a system bus 950. The processor 910 can be configured to process instructions for execution within the system 900. In some implementations, the processor 910 can be a single-threaded processor. In alternate implementations, the processor 910 can be a multi-threaded processor. The processor 910 can be further configured to process instructions stored in the memory 920 or on the storage device 930, including receiving or sending information through the input/output device 940. The memory 920 can store information within the system 900. In some implementations, the memory 920 can be a computer-readable medium. In alternate implementations, the memory 920 can be a volatile memory unit. In yet some implementations, the memory 920 can be a non-volatile memory unit. The storage device 930 can be capable of providing mass storage for the system 900. In some implementations, the storage device 930 can be a computer-readable medium. In alternate implementations, the storage device 930 can be a floppy disk device, a hard disk device, an optical disk device, a tape device, non-volatile solid state memory, or any other type of storage device. The input/output device 940 can be configured to provide input/output operations for the system 900. In some implementations, the input/output device 940 can include a keyboard and/or pointing device. In alternate implementations, the input/output device 940 can include a display unit for displaying graphical user interfaces.

Figure 10:
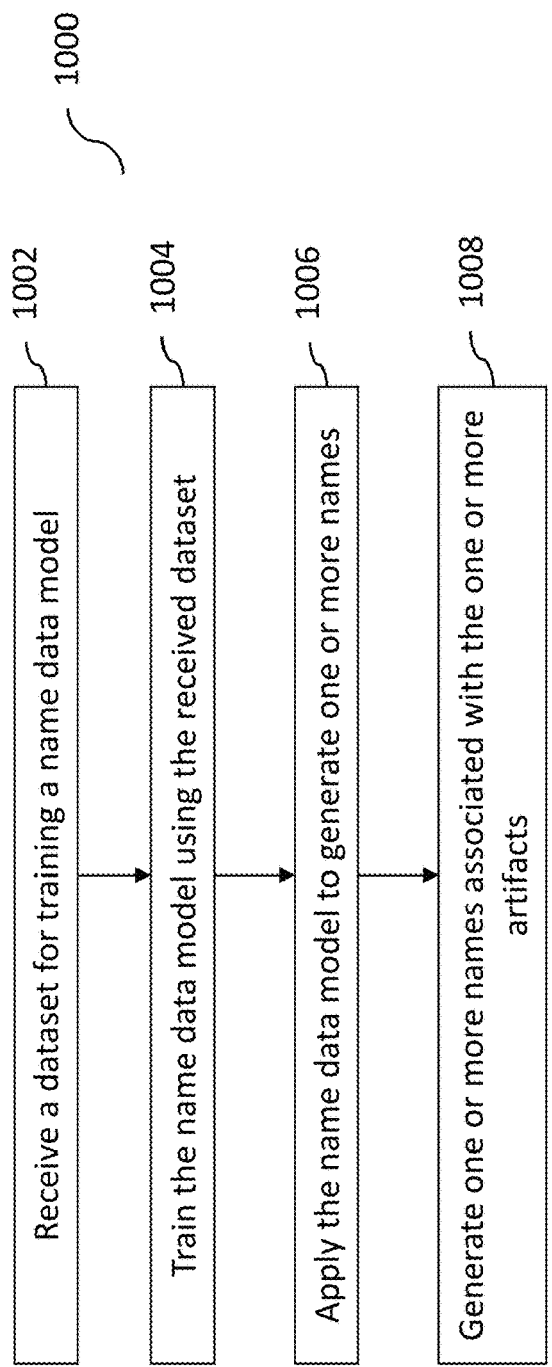
FIG. 10 illustrates an exemplary method, according to some implementations of the current subject matter.

FIG. 10 illustrates an exemplary method 1000 for generating name recommendations in a core data services environment, according to some implementations of the current subject matter. The method 1000 may be configured to be performed using system 100 as shown in FIG. 1. In particular, the recommendation engine 104 may be configured to execute determination of the names (e.g., names/terms/annotations) and provide recommendations to one more users 102. The process 1000 may be performed using one or more concepts discussed above with regard to FIGS. 1-6.

At 1002, a dataset for training a name data model may be received. For example, the recommendation engine 104 may be configured to receive a dataset that may include data related to core data services system guidelines, interactions of users with the framework 104, historical data related to the names of the CDS views, field names, annotations, etc. The data may be pre-processed by the pre-processing engine 116. The generation engine 118 may be configured to perform machine learning using the name data model to determine a recommendation for one or more names (e.g., performance annotation, CDS view name, CDS field name, etc.) in a plurality of names associated with one or more artifacts (e.g., objects, fields, views, functions, processes, etc.) in a plurality of artifacts of a database management system.

At 1004, the generation engine 118 may be configured to perform training of the name data model using the received data. As a result of the training, generation engine 118 may be configured to generate recommendations to the user for CDS performance annotations, CDS view names, CDS field names, etc. by applying the name data model, at 1006. At 1008, the recommendation engine 104 (upon completion of the training and evaluation (by the evaluation engine 120)) may be configured to generate one or more names associated with the artifacts.

In some implementations, the current subject matter may include one or more of the following optional features. For example, the names may include at least one of the following: one or more performance annotations of core data services associated with the database management system, one or more names of one or more views of the core data services, one or more names of one or more fields of the core data services, and any combination thereof.

In some implementations, the names may be generated based on one or more interactions of a user (e.g., user 102) with the core data services framework (e.g., framework 104). The performance annotations of the core data services may be generated based on at least one of the following categories: a size of the artifacts category, a service quality associated with the artifacts category, a data class of the artifacts category, and any combination thereof.

In some implementations, the training may be performed using at least one of the following patterns: one or more properties of one or more database tables of the database management system associated with one or more views of the core data services pattern, one or more use of the views of the core data services pattern, one or more queries of the core data services pattern, and any combination thereof.

In some implementations, the names may also be generated using one or more historical names of the artifacts. The names may also be abbreviated using one or more dictionaries.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
   receiving, by at least one processor, a dataset for training, using a machine learning engine, a name data model, wherein the name data model includes a recurrent neural network (RNN) comprising an encoder and a decoder, the RNN configured for determination of a recommendation for one or more names in a plurality of names associated with one or more artifacts in a plurality of artifacts of a database management system, the dataset including data related to core data services system guidelines;
   training, using the machine learning engine and by the at least one processor, the RNN of the name data model using the received dataset;
   applying, by the at least one processor, the trained RNN of the name data model to generate one or more names;
   generating, by the at least one processor using the trained RNN of the name data model, one or more names associated with the one or more artifacts, wherein the generating comprises:
   automatically generating performance annotations for core data services views in accordance with core data services guidelines for performance annotations, wherein the performance annotations enrich a definition of a model element in the core data services guidelines with metadata, and automatically generating technical names for development artifacts in accordance with core data services guidelines for nomenclature;

detecting compliance with the core data services system guidelines by continuously evaluating a divergence between the technical names for development artifacts and names according to the core data services system guidelines; and in response to the divergence exceeding a predetermined threshold, re-training, using the machine learning engine, the RNN of the name data model using a training dataset formed from one or more interactions of a user with the core data services.

2. The method according to claim 1, wherein the one or more names include at least one of the following: one or more performance annotations of core data services associated with the database management system, one or more names of one or more views of the core data services, one or more names of one or more fields of the core data services, and any combination thereof.

3. The method according to claim 2, wherein the one or more names are generated based on the one or more interactions of the user with the core data services.

4. The method according to claim 2, wherein the one or more performance annotations of the core data services are generated based on at least one of the following categories: a size of the one or more artifacts category, a service quality associated with the one or more artifacts category, a data class of the one or more artifacts category, and any combination thereof.

5. The method according to claim 2, wherein the training is performed using at least one of the following patterns: one or more properties of one or more database tables of the database management system associated with one or more views of a core data services pattern, one or more use of the one or more views of the core data services pattern, one or more queries of the core data services pattern, and any combination thereof.

6. The method according to claim 2, wherein the one or more names are generated using one or more historical names of the one or more artifacts.

7. The method according to claim 6, wherein the one or more names are abbreviated using one or more dictionaries.

8. A system comprising:
at least one programmable processor; and
a non-transitory machine-readable medium storing instructions that, when executed by the at least one programmable processor, cause the at least one programmable processor to perform operations comprising:

receiving, by at least one processor, a dataset for training, using a machine learning engine, a name data model, wherein the name data model includes a recurrent neural network (RNN) comprising an encoder and a decoder, the RNN configured for determination of a recommendation for one or more names in a plurality of names associated with one or more artifacts in a plurality of artifacts of a database management system, the dataset including data related to core data services system guidelines;

training, using the machine learning engine and by the at least one processor, the RNN of the name data model using the received dataset;

applying, by the at least one processor, the trained RNN of the name data model to generate one or more names;

generating, by the at least one processor using the trained RNN of the name data model, one or more names associated with the one or more artifacts, wherein the generating comprises:

automatically generating performance annotations for core data services views in accordance with core data services guidelines for performance annotations, wherein the performance annotations enrich a definition of a model element in the core data services guidelines with metadata, and automatically generating technical names for development artifacts in accordance with core data services guidelines for nomenclature;

detecting compliance with the core data services system guidelines by continuously evaluating a divergence between the technical names for development artifacts and names according to the core data services system guidelines; and in response to the divergence exceeding a predetermined threshold, re-training, using the machine learning engine, the RNN of the name data model using a training dataset formed from one or more interactions of a user with the core data services.

9. The system according to claim 8, wherein the one or more names include at least one of the following: one or more performance annotations of core data services associated with the database management system, one or more names of one or more views of the core data services, one or more names of one or more fields of the core data services, and any combination thereof.

10. The system according to claim 9, wherein the one or more names are generated based on the one or more interactions of the user with the core data services.

11. The system according to claim 9, wherein the one or more performance annotations of the core data services are generated based on at least one of the following categories: a size of the one or more artifacts category, a service quality associated with the one or more artifacts category, a data class of the one or more artifacts category, and any combination thereof.

12. The system according to claim 9, wherein the training is performed using at least one of the following patterns: one or more properties of one or more database tables of the database management system associated with one or more views of a core data services pattern, one or more use of the one or more views of the core data services pattern, one or more queries of the core data services pattern, and any combination thereof.

13. The system according to claim 9, wherein the one or more names are generated using one or more historical names of the one or more artifacts.

14. The system according to claim 13, wherein the one or more names are abbreviated using one or more dictionaries.

15. A computer program product comprising a non-transitory machine-readable medium storing instructions that, when executed by at least one programmable processor, cause the at least one programmable processor to perform operations comprising:

receiving, by at least one processor, a dataset for training, using a machine learning engine, a name data model, wherein the name data model includes a recurrent neural network (RNN) comprising an encoder and a decoder, the RNN configured for determination of a recommendation for one or more names in a plurality of names associated with one or more artifacts in a plurality of artifacts of a database management system, the dataset including data related to core data services system guidelines;

training, using the machine learning engine and by the at least one processor, the RNN of the name data model using the received dataset;

applying, by the at least one processor, the trained RNN of the name data model to generate one or more names;

generating, by the at least one processor using the trained RNN of the name data model, one or more names associated with the one or more artifacts, wherein the generating comprises:

automatically generating performance annotations for core data services views in accordance with core data services guidelines for performance annotations, wherein the performance annotations enrich a definition of a model element in the core data services guidelines with metadata, and automatically generating technical names for development artifacts in accordance with core data services guidelines for nomenclature;

detecting compliance with the core data services system guidelines by continuously evaluating a divergence between the technical names for development artifacts and names according to the core data services system guidelines; and in response to the divergence exceeding a predetermined threshold, re-training, using the machine learning engine, the RNN of the name data model using a training dataset formed from one or more interactions of a user with the core data services.

16. The computer program product according to claim 15, wherein the one or more names include at least one of the following: one or more performance annotations of core data services associated with the database management system, one or more names of one or more views of the core data services, one or more names of one or more fields of the core data services, and any combination thereof.

17. The computer program product according to claim 16, wherein the one or more names are generated based on the one or more interactions of the user with the core data services.

18. The computer program product according to claim 16, wherein the one or more performance annotations of the core data services are generated based on at least one of the following categories: a size of the one or more artifacts category, a service quality associated with the one or more artifacts category, a data class of the one or more artifacts category, and any combination thereof.

19. The computer program product according to claim 16, wherein the training is performed using at least one of the following patterns: one or more properties of one or more database tables of the database management system associated with one or more views of a core data services pattern, one or more use of the one or more views of the core data services pattern, one or more queries of the core data services pattern, and any combination thereof.

20. The computer program product according to claim 16, wherein the one or more names are generated using one or more historical names of the one or more artifacts, wherein the one or more names are abbreviated using one or more dictionaries.

* * * * *